United States Patent [19]

Persson

[11] 4,302,173
[45] Nov. 24, 1981

[54] MOULDING MACHINE

[76] Inventor: Bertil Persson, Kerstis Vag 12, Hjarup 222.48 Lund, Sweden

[21] Appl. No.: 15,971

[22] Filed: Feb. 28, 1979

[30] Foreign Application Priority Data

Mar. 1, 1978 [SE] Sweden .............................. 7802304

[51] Int. Cl.³ .............................................. A21C 5/00
[52] U.S. Cl. ................................ 425/192 R; 425/190; 425/238; 425/239; 425/256; 17/32
[58] Field of Search ..................... 17/32; 425/190, 256, 425/192 R, 238, 239

[56] References Cited

U.S. PATENT DOCUMENTS

| | | | |
|---|---|---|---|
| 3,416,187 | 12/1968 | Chartier | 17/32 |
| 3,588,948 | 6/1971 | Holly | 17/32 |
| 3,648,600 | 3/1972 | Jaccard | 17/32 |

FOREIGN PATENT DOCUMENTS 961532 6/1964 United Kingdom .
1219452 1/1971 United Kingdom .

Primary Examiner—James H. Derrington
Attorney, Agent, or Firm—Schwartz, Jeffery, Schwaab, Mack, Blumenthal & Koch

[57] ABSTRACT

A machine for moulding mouldable products, preferably foodstuff masses. A piston is slidable in a piston passage of a housing and a moulding tool defining a moulding cavity is slidable in a moulding tool passage of the housing. The piston and moulding tool are coupled to a common rotary drive disc for reciprocation such that when the moulding tool is in a first position, the piston pumps the mouldable product into the moulding cavity, compacting the product to a desired consistency, and when the moulding tool is in a second position, the mouldable product compacted in the moulding cavity is discharged from the machine.

7 Claims, 7 Drawing Figures

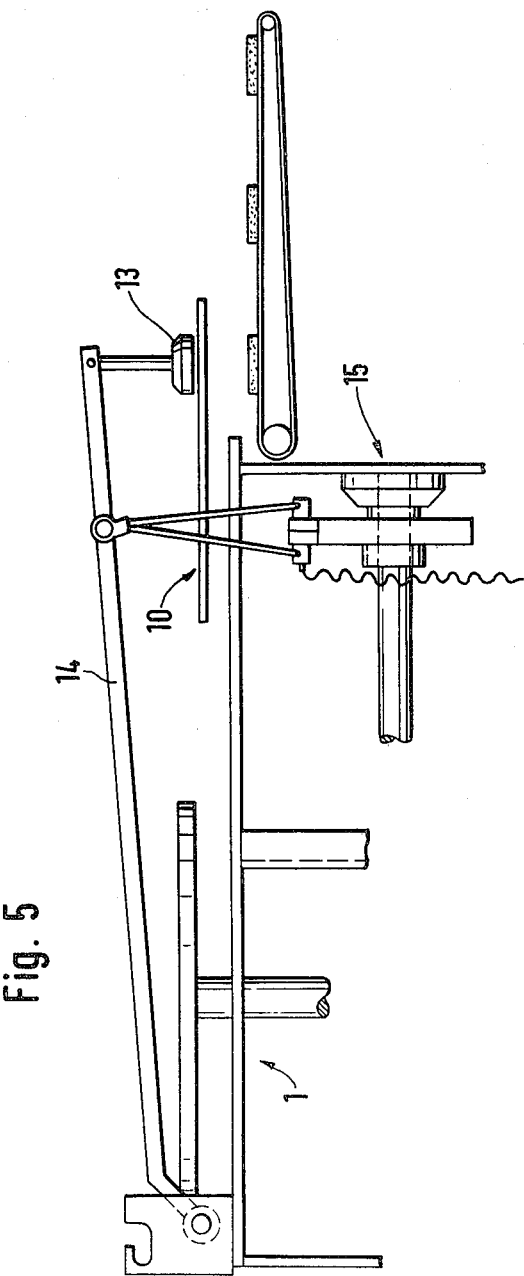

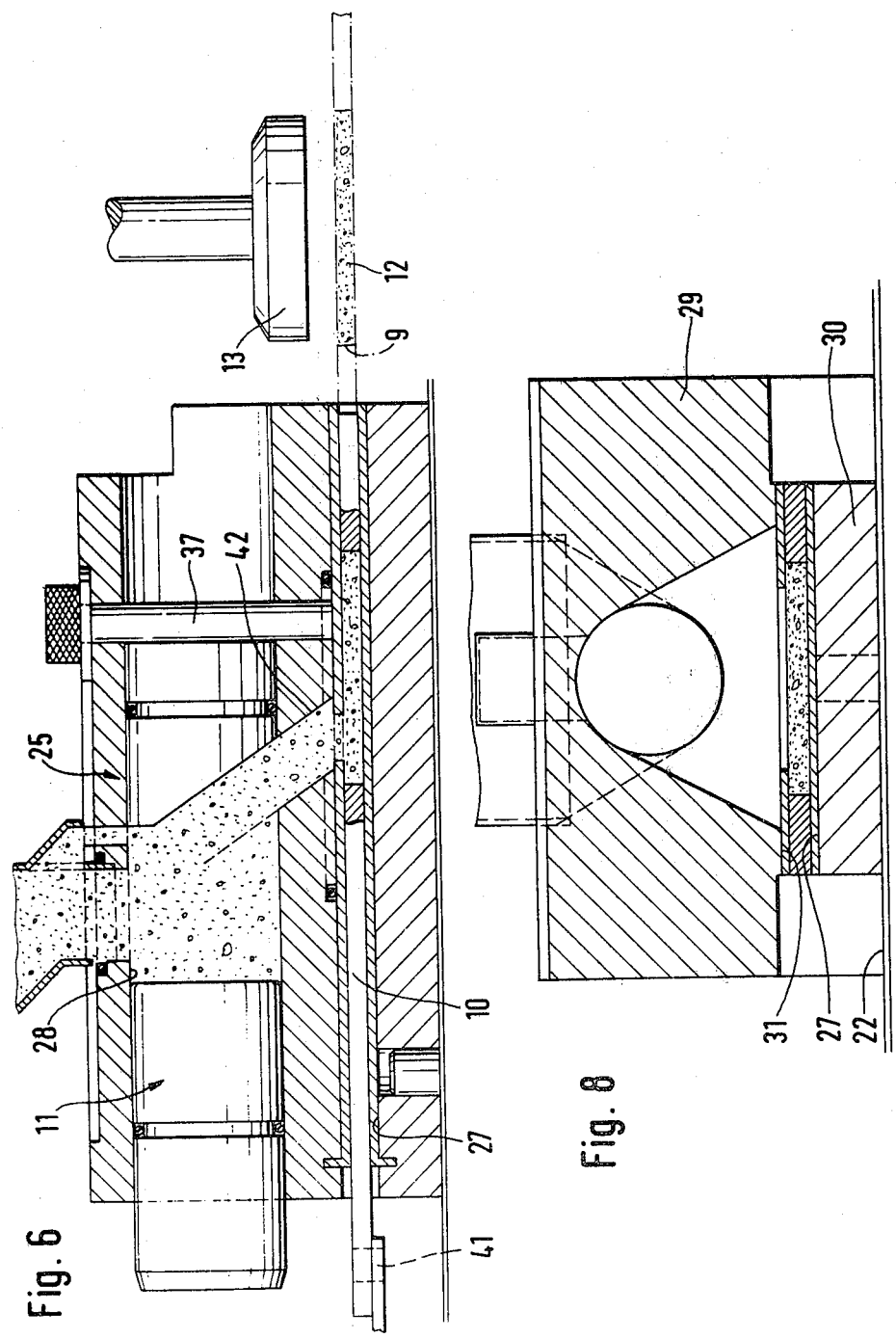

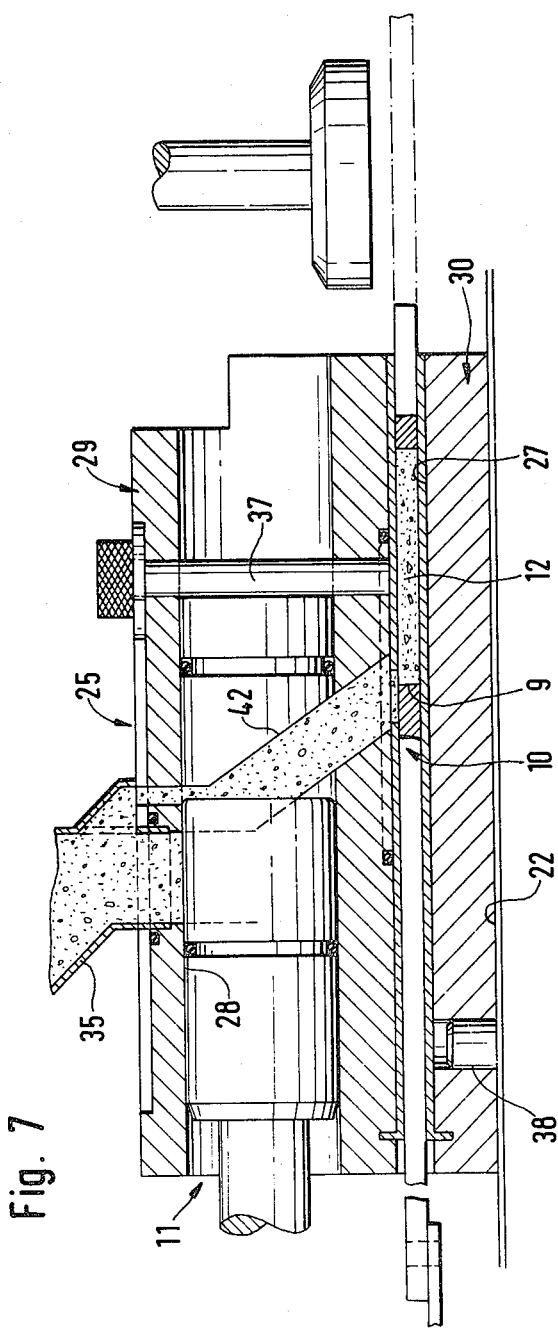

MOULDING MACHINE

The present invention relates to a moulding machine for moulding mouldable products, preferably foodstuff masses in the form of meat masses, fish masses or potato masses, in which the mouldable product is fed into at least one combined pumping and moulding mechanism adapted: (1) to pump the product into at least one moulding cavity within at least one moulding tool by means of at least one piston device, (2) to compact the product into a desired consistency, and (3) to discharge the product from the machine by means of the moulding tool.

Moulding machines of the above-described type involve high cost of production and have a fairly limited speed of opertion. This depends, inter alia, on the fact that the driving arrangement of the machine consists of a great number of mobile elements, some of which must perform long-stroke movements.

The present invention has for its object to eliminate all these drawbacks and to provide a moulding machine, the driving arrangement of which is highly simplified, substantially more compact, and rapid and silent in operation. This object, according to the invention, is attained substantially by the fact that the piston device and moulding tool of the pumping and moulding mechanism are disposed at the level of at least one rotary drive mechanism for driving the piston device and the moulding tool.

The invention will be more closely described hereinafter with reference to the accompanying drawings, in which.

Figure 4:
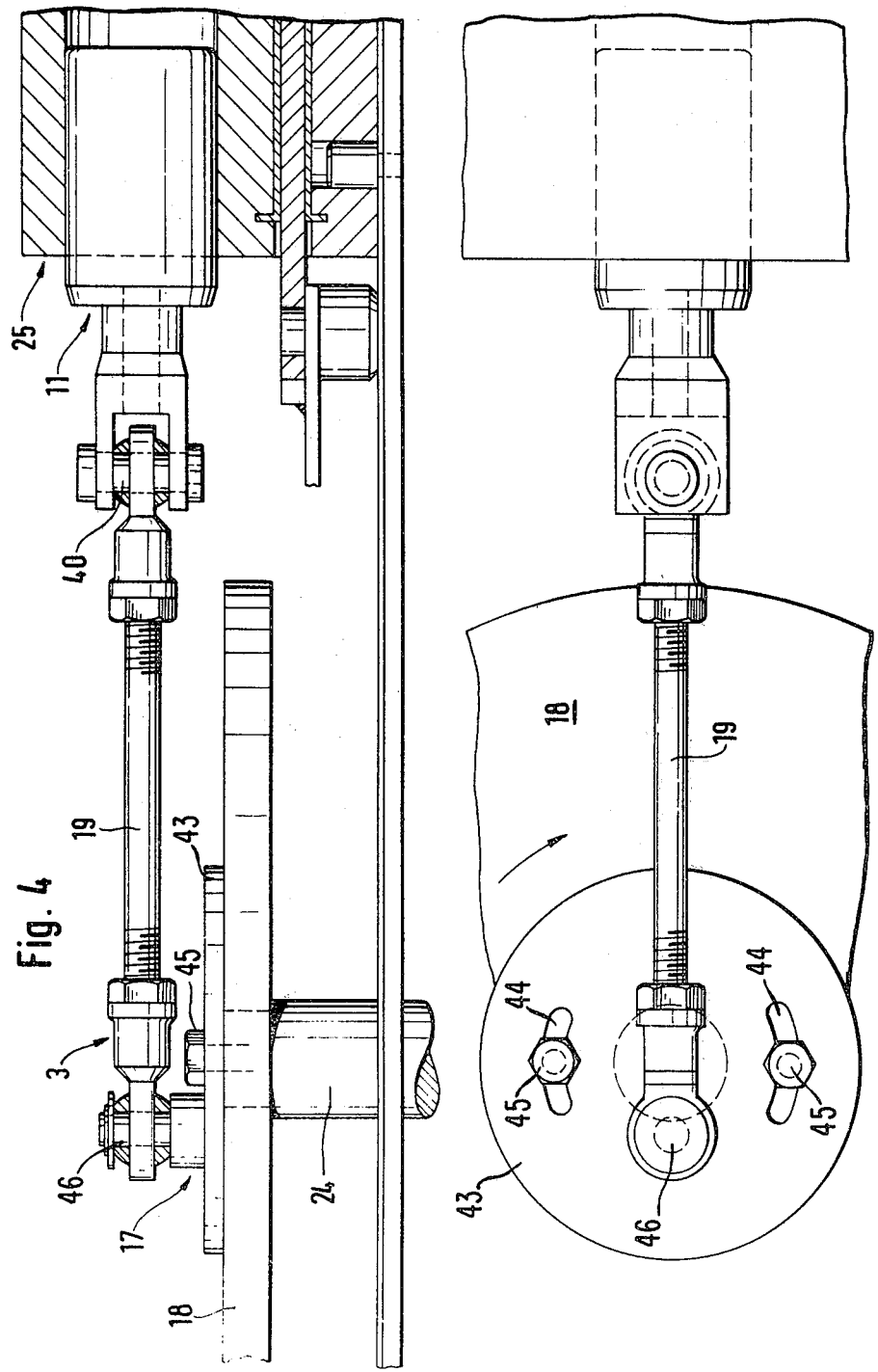

FIG. 4 diagrammatically shows a driving mechanism for a mould-carrying platen and a pump forming part of the moulding machine;

FIG. 5 is a diagrammatic illustration of a punching mechanism forming part of the moulding machine;

FIG. 6 diagrammatically illustrates a pump comprised in the moulding machine, as the piston forming part of has drawn the pump housing full with material from the container having the feed worm therein;

FIG. 7 illustrates said pump with its piston in a frontmost position and with the material pumped down into a moulding cavity in a mould platen; and FIG. 8 is a frontal view of the machine illustrated in FIG. 7.

The moulding machine illustrated is intended for moulding mouldable products, preferably foodstuffs in the form of meat masses, fish masses or potato masses. The machine substantially comprises a machine stand 1, drive means 2, a pump and moulding mechanism 3 driven by the drive means 2, and a container 4 for the material to be moulded.

The drive means 2 includes a drive motor 5 adapted, through various transmissions 6, 7 and 8, to operate the pump and moulding mechanism 3. The latter is adapted to receive the material to be moulded from the container 4, to pump the material to at least one mould cavity 9 by means of at least one piston device 11, to compact the material into a desired consistency, and to discharge the material from the machine by means of the moulding tool 10. Mouldings 12 prepared from the material are pushed out from the cavity 9 by a piston member 13 which is mounted on a punching mechanism 14 driven by the motor 5 through a transmission 15. The piston 13 pushes the moulded units, for instance meat cakes 12, downward onto the conveyor 16 adapted to convey the same along a predetermined route.

In order, in such a moulding machine, to reduce the number of movable parts, to increase stability and to impart to the machine a higher speed of operation, as well as a silent mode of operation, its pump and moulding mechanism 3 is disposed flush with at least one rotary driving mechanism 17 which is adapted to drive the piston device 11 and the moulding tool 10. A particularly simple and fast-running construction is obtained by the fact that the drive mechanism 17 comprises a rotary disc 18 to which the piston device 11 and the moulding tool 10 are directly mounted, viz. by the aid of a detachable lever 19 forming part of the piston device and by the aid of a detachable lever 20 forming part of the moulding tool. The disc 18 may be formed with a curved cam track (not shown), for example in the form of a groove, for guiding the moulding tool 10 and/or the piston device 11, because in this way it is possible to obtain a fast and silently operating drive mechanism 17.

In order to impart to the machine a compact design and, at the same time, to gain accessibility as required for its essential components, the rotary drive mechanism 17, the piston device 11 and the moulding tool 10 may be disposed in a space 21 which, on one hand, is defined at its bottom by the top surface 22 of a machine stand 1 with the drive system for the machine, and, on the other hand, is defined at its top by the bottom 23 of a container 4 for the mouldable material.

To the end of providing an extremely simple driving system 2, the disc 18 of the rotary drive mechanism 17 may be carried by a vertical shaft 24 which is mounted on the machine stand 1 and projects into the space 21.

A cam disc 43 is releasably mounted on rotary disc 18 by retaining screws 45 passing through slots 44 and in cam disc 43. Lever member 19 pivotally connects the piston 11 to a bearing 46 eccentrically arranged on the cam disc 43 relative to the axis of rotation of rotary disc 18. The cam disc 43 is swingable relative to rotary disc 18, when screws 45 are loosened, for changing the eccentricity of bearing 46 relative to the axis of rotation of rotary disc 18.

Efficient control of the pump device 11 and moulding tool 10 of the pump and moulding mechanism 3 is obtained by the fact that the pump- and moulding mechanism 3 comprises a combined pump- and moulding housing 25 having spaced parallel bores 26 for the piston device 11 and moulding tool 10, the pump- and moulding housing 25 comprising a top portion 29 including the bore 28 for the piston device 11, and a bottom portion 30 of substantially equal length and detachably connected thereto and defining with the bottom surface 31 of the top portion 29 the bore 27 for the moulding tool 10.

The container 4 includes a feed worm 32 which, through a transmission 33, is driven by a motor 34. Said feed worm 32 is adapted to press material housed in the container 4 through a funnel-shaped outlet 35 into an inclined passageway 42 within the pump- and moulding housing 25. Material contained in the passageway 42 is actuated by the piston device 11 and is pressed down into the mould cavity 9 of the moulding tool 10. When the moulding tool 10 discharges said material from the machine, it has reached the consistency and shape aimed at.

It is essential in moulding machines of the actual type to be able rapidly to remove the pump- and moulding housing 25 and to bring the container 4 into a position for efficient cleaning. This may be effected owing to the fact that the pump- and moulding housing 25 forming part of the pump- and moulding mechanism 17 and a container 4 for the mouldable material and connected to the pump- and moulding housing 25 is anchored to a stand 1 for the machine by at least one anchorage member 37 extending through the front-most portion 36 of the container 4 and through the housing 25, and that, after releasing the anchorage member 37, the container 4 is detachable from the housing 25 and, after removal of the housing 25 from the stand 1, the container 4 can be lowered, so that its front end is supported on the stand 1 so as to attain a suitable position of the container 4 for washing and/or drying the latter. The anchorage member may suitably be a bolt 37 passing through a container flange 36 engaging the pump- and moulding housing 25 and through the pump- and moulding housing 25 and anchored to a fixation element 38 for the pump- and moulding housing 25, which element is mounted on the machine stand 1.

Figure 1:
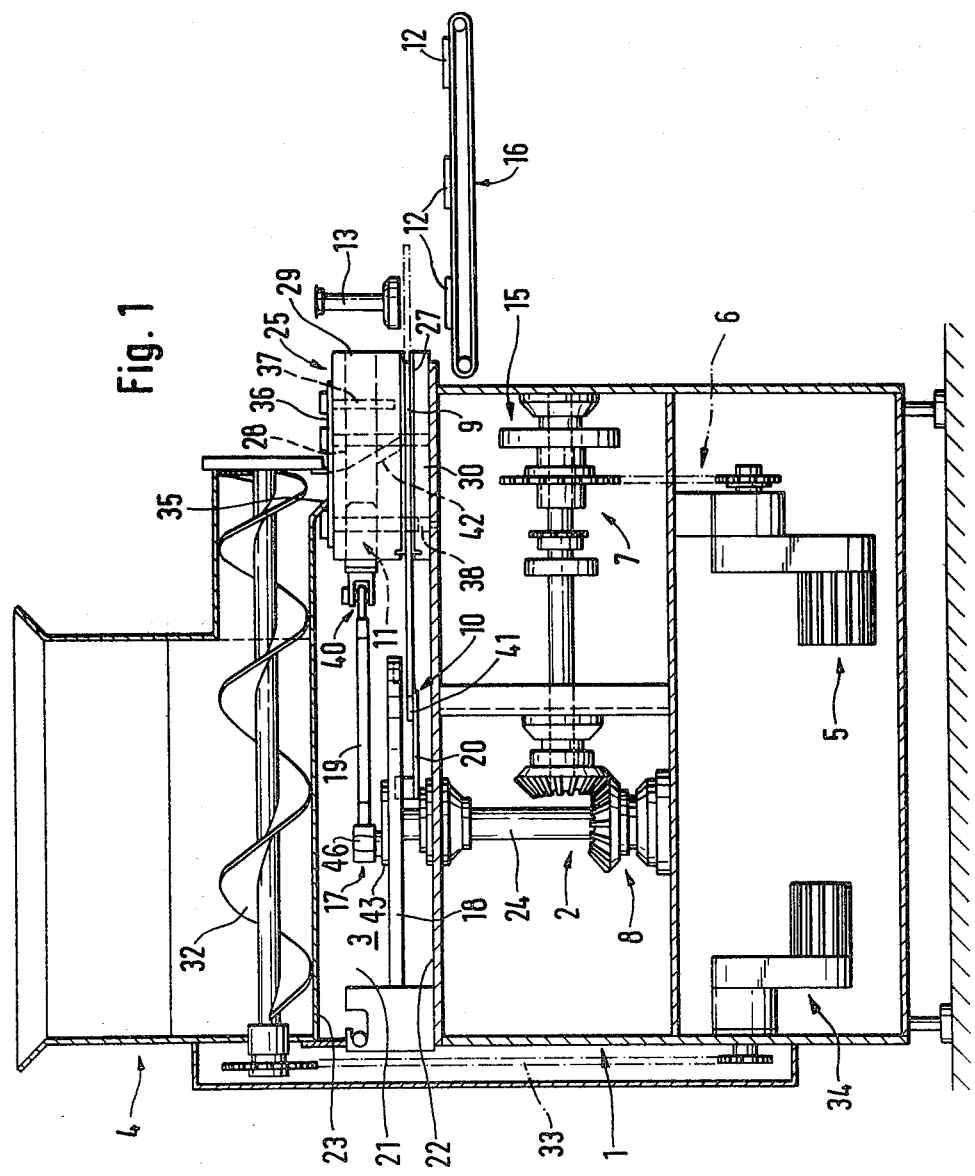
FIG. 1 is a diagrammatic side-view, partly broken away, of a moulding machine according to the present invention.
Figure 2:
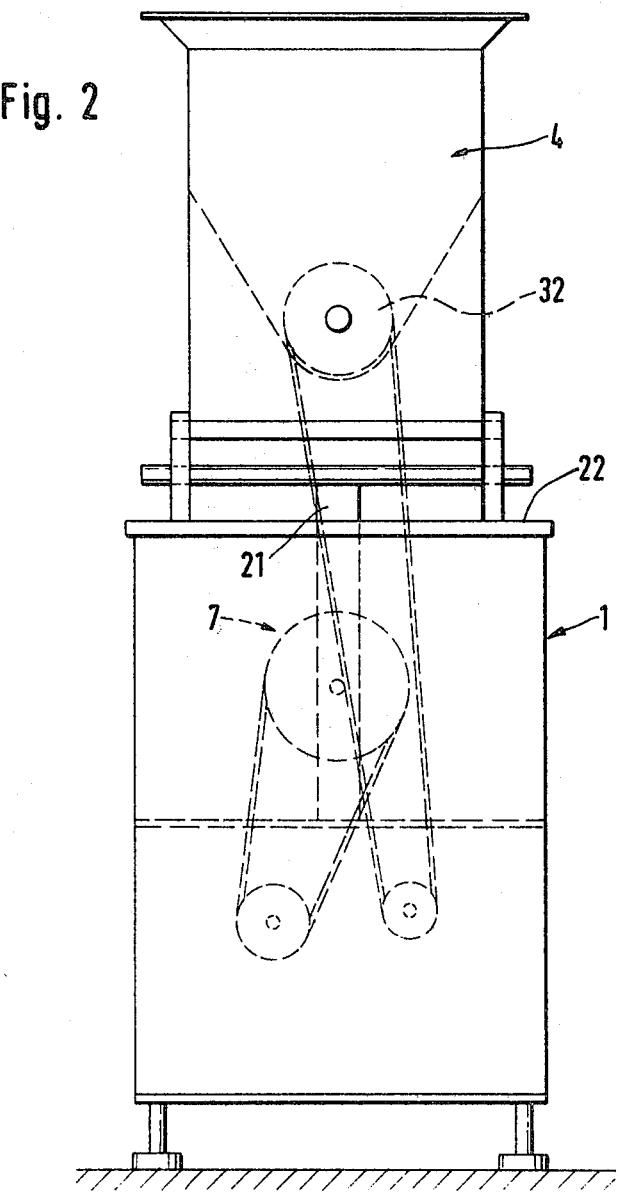
FIG. 2 is a frontal view of said moulding machine.
Figure 3A:
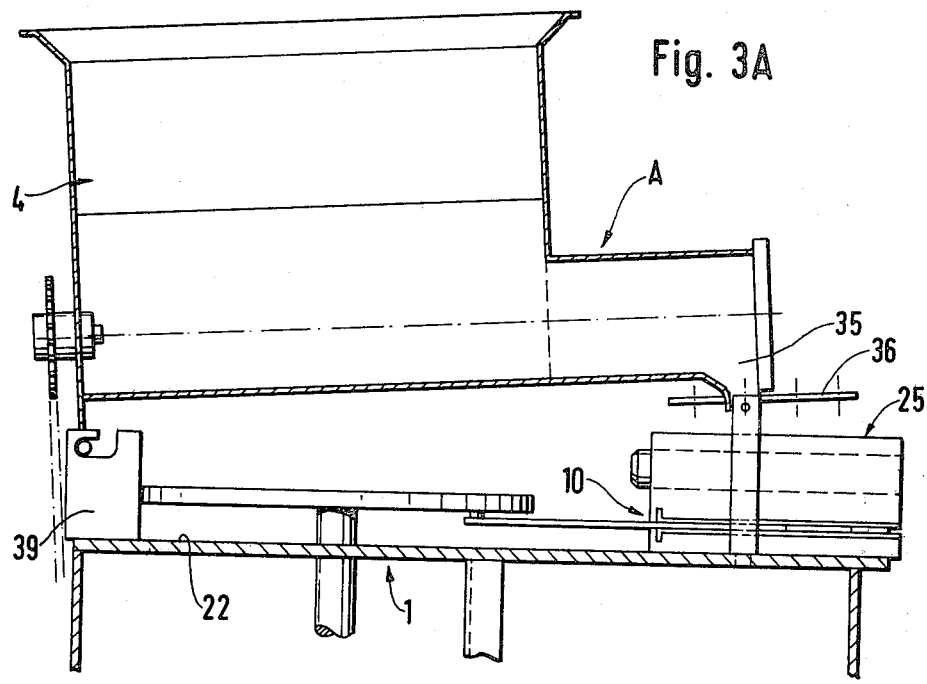
FIG. 3A is a diagrammatic view of part of said moulding machine with a container having a feed worm therein shown in a raised position.
Figure 3B:
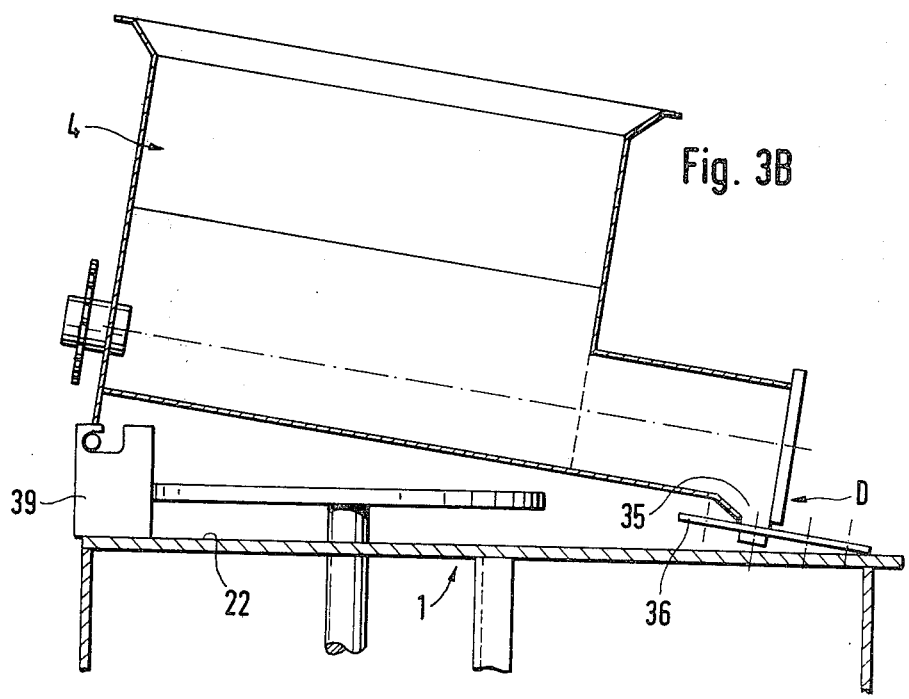
FIG. 3B shows the container in a lowered position.

The container 4 is seated at its rear side on a bracket 39 which enables the same to be swung upward to take up the position A of FIG. 3A, whereby the pump- and moulding housing 25 can be removed and enable the container 4 to be lowered into position D. Upon completed lowering of container 4, the flushing liquid will immediately drain through the outlet 35, so that cleaning and drying will be substantially facilitated.

The machine illustrated in the drawings includes a lot of less essential details, i.e. snap-couplings 40 and 41 comprised in the pump device 11 and moulding tool 10 and are adapted to enable dismantling of parts projecting into the pump- and moulding housing 25 and associated with the disc 18.

The invention is not restricted to the embodiment illustrated but may be varied within the scope of the appended claims.

I claim:

1. A moulding machine for moulding mouldable products, preferably foodstuff masses in the form of meat masses, fish masses or potato masses, comprising
    means for defining a piston passage and a moulding tool passage communicating with said piston passage;
    a piston slidably disposed in said piston passage;
    a moulding tool defining a moulding cavity, said moulding tool slidably disposed in said moulding tool passage;
    a generally vertical drive shaft;
    means for rotatably driving said drive shaft;
    a rotary disc mounted on one end of said drive shaft for rotation therewith about an axis;
    means for coupling said moulding tool to said rotary disc to effect reciprocation of said moulding tool in said moulding tool passage with rotation of said rotary disc; and
    means for coupling said piston eccentrically to said rotary disk to effect reciprocation of said piston in said piston passage with rotation of said rotary disc, comprising
    cam means releasably mounted on said rotary disc,
    a bearing eccentrically arranged on said cam means relative to said axis, and
    a member pivotally connecting said piston and said bearing,
    said cam means when released being swingable relative to said rotary disc to change the eccentricity of said bearing relative to said axis,
    wherein said piston and said moulding tool are coupled to said rotary disc such that when said moulding tool is in a first position said piston pumps the mouldable product into said moulding cavity, compacting the product to a desired consistency, and when said moulding tool is in a second position the mouldable product compacted in said moulding cavity is discharged from the machine.

2. The moulding machine of claim 1, wherein said cam means comprises a slotted cam disc arranged centrally of the rotary disc, said piston coupling means further comprising screws passing through slots in said cam disc for releasably retaining said cam disc on said rotary disc, said cam disc being swingable when said screws are loosened.

3. The moulding machine of one of claims 1 or 2, wherein said cam means is mounted on an upper side of said rotary disc, further comprising a cam track on an under side of said rotary disc, said moulding tool coupling means cooperating with said cam track to effect said reciprocation of said moulding tool.

4. The moulding machine of one of claims 1 or 2, wherein said passage defining means comprises a pump and moulding housing, the machine further comprising:
    a machine stand supporting said housing;
    a container for the mouldable product pivotally mounted at one end to said machine stand and supported at the other end by said housing, said container having a flange at said other end extending over a portion of said housing; and
    means extending through said flange and said housing for releasably anchoring said container and said housing to said machine stand;
    whereby when said anchoring means is released, said housing may be removed from said machine and said other end of said container may be lowered to rest on said machine stand to facilitate washing and/or drying of said container.

5. The moulding machine of claim 3, wherein said passage defining means comprises a pump and moulding housing, the machine further comprising:
    a machine stand supporting said housing;
    a container for the mouldable product pivotally mounted at one end to said machine stand and supported at the other end by said housing, said container having a flange at said other end extending over a portion of said housing; and
    means extending through said flange and said housing for releasably anchoring said container and said housing to said machine stand;
    whereby when said anchoring means is released, said housing may be removed from said machine and said other end of said container may be lowered to rest on said machine stand to facilitate washing and/or drying of said container.

6. The moulding machine of claim 4, wherein said anchoring means comprises a bolt, said machine further comprising a fixation element mounted on said machine stand for releasably engaging said bolt.

7. The moulding machine of claim 3, wherein said anchoring means comprises a bolt, said machine further comprising a fixation element mounted on said machine stand for releasably engaging said bolt.

* * * * *